United States Patent Office 3,257,714
Patented June 28, 1966

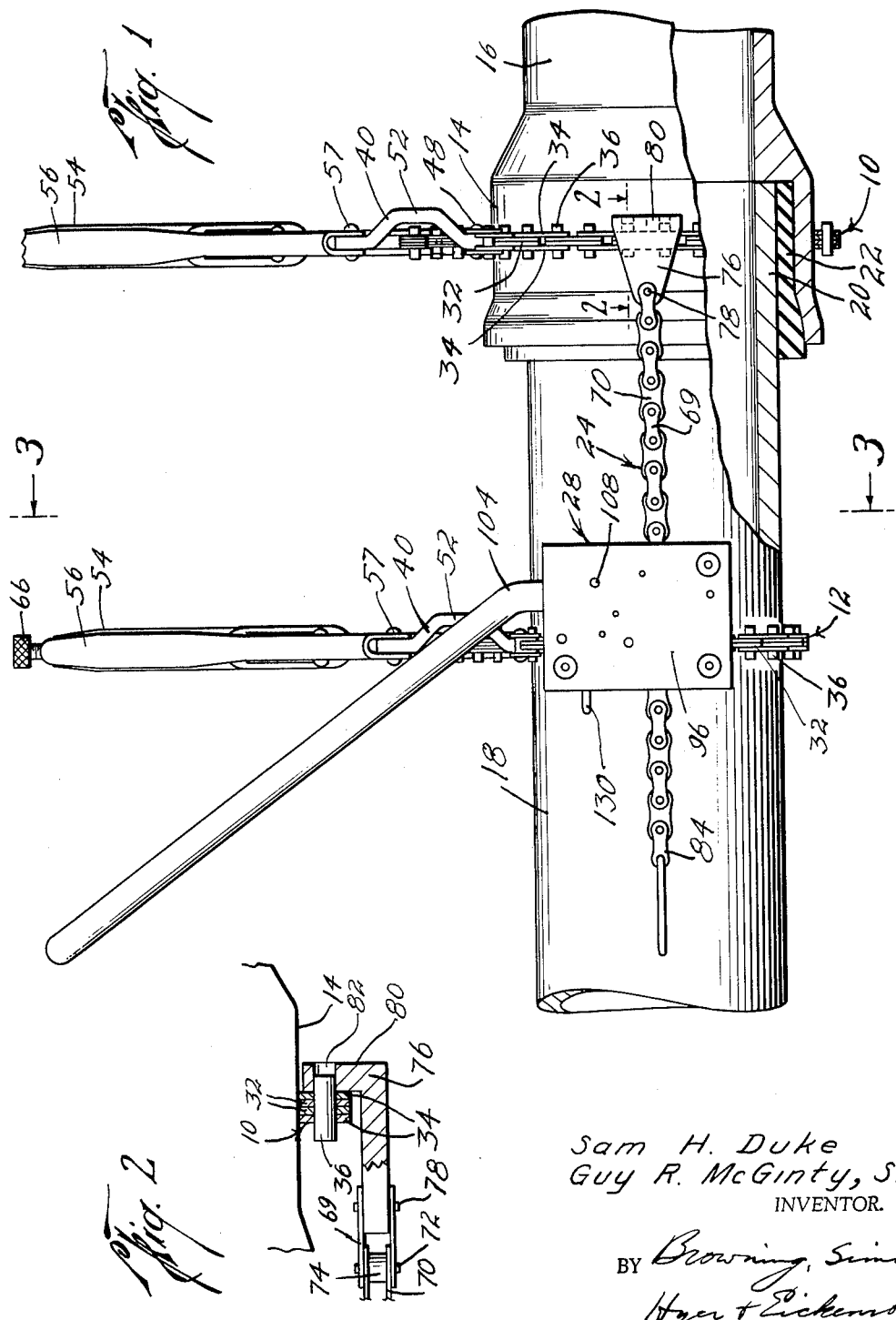

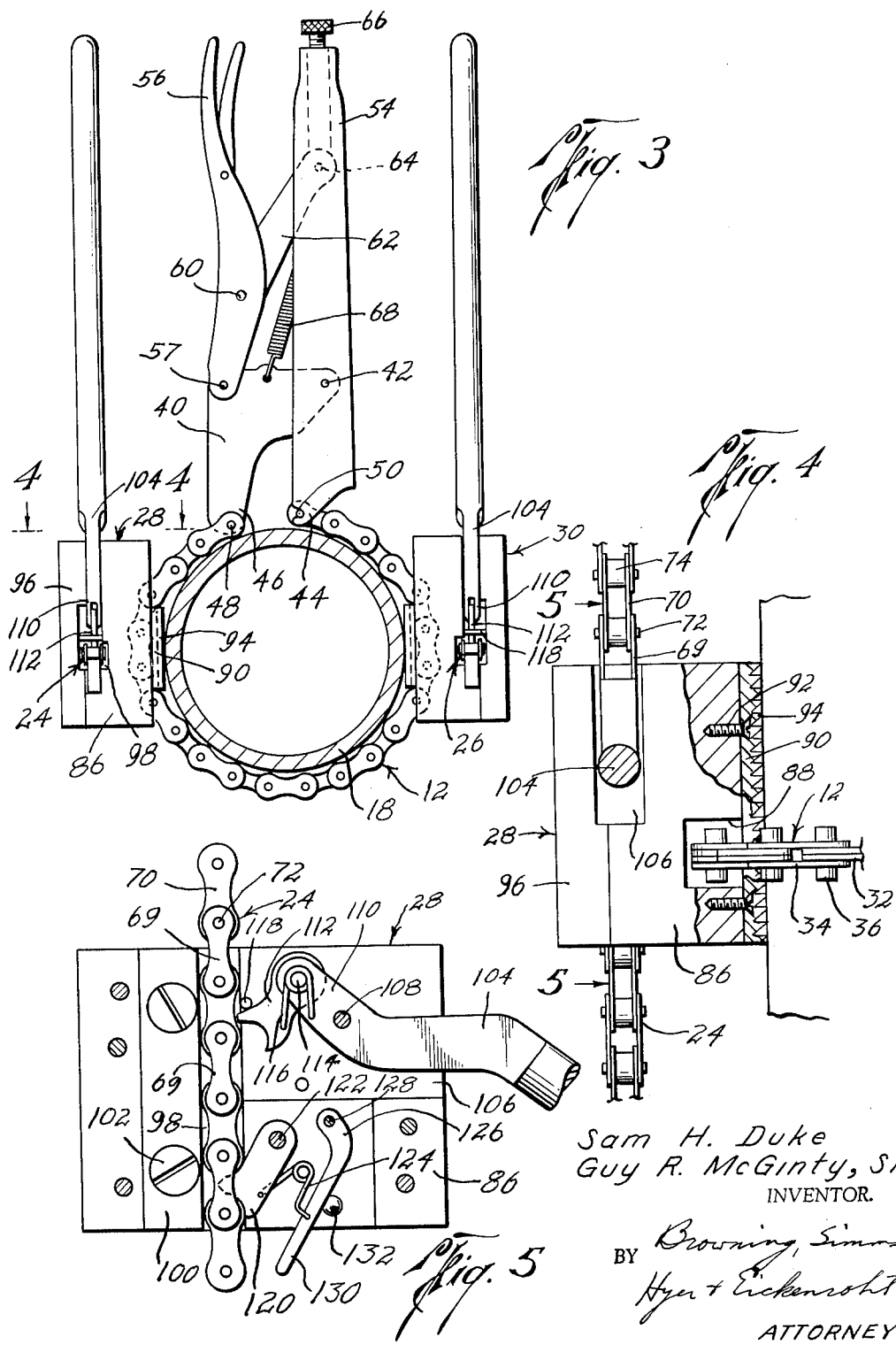

3,257,714
APPARATUS FOR MAKING UP GASKET SEALED
TELESCOPING PIPE JOINTS
Sam H. Duke, 5406 Karcher St., Houston, Tex., and Guy
R. McGinty, Sr., P.O. Box 233, Crosby, Tex.
Filed Apr. 3, 1964, Ser. No. 357,129
5 Claims. (Cl. 29—237)

This invention relates to an apparatus for joining together two joints or sections of pipe in a telescoping joint of which one example is commonly known as a bell and spigot joint, with the seal between the parts of such joint being effected by a gasket formed of a suitable elastomer or the like.

Recently telescoping joints instead of being caulked and leaded as formerly, have been formed by forcing the end of one section of pipe into a larger pipe section or collar or into the enlarged end of another section of pipe, with a gasket therebetween. Such gasket is formed of an elastomer of suitable composition and of such initial dimensions that when forced to occupy the space between the telescoping pipe ends, it will be so deformed as to provide a highly satisfactory seal and a strong mechanical connection between the sections of pipe.

Joints of this character have been found highly satisfactory in use but have involved considerable difficulty in making them up because of the great amount of force required to move the larger and smaller pipe parts into proper relationship with each other with the gasket of elastomer therebetween. A number of efforts have been made to provide mechanisms for carrying out this operation, but each has failed in one or more respects to provide the characteristics necessary for a satisfactory solution to this problem.

Thus prior devices for this and similar purposes, when applied to this problem, have in some instances been quite expensive to manufacture or to maintain, some have been more complicated than the personnel usually employed in the make-up of such joints could be readily trained to manipulate without excessive difficulty, some have been so difficult to operate manually as intended that they necessarily applied lateral forces to the joint being formed such as to tend to produce defective or misaligned joints, most have required a different device or one or more adapters, for different sizes of pipe, some have required more space surrounding the pipe sections to be joined than is available under many circumstances, most have required an excessive amount of space for storage and have involved difficulty in transportation, some have required special kinds of power not always available on the site in which use is required, and in most if not all cases the apparatus so devised has been incapable of forming joints between pipe sections with extremely limited body lengths available to receive the anchoring portions of the apparatus.

It is therefore an object of this invention to provide an apparatus which will make up joints of the type above described in a wholly efficient and satisfactory manner and avoid the difficulties inherent in prior devices for this general purpose.

Another object is to provide an apparatus a single embodiment of which will operate, without alteration or adapters, on a wide range of pipe sizes.

Another object is to provide a device of the character described which will be simple and inexpensive, both to manufacture and to operate.

Another object is to provide such a device which will be easier to apply and to operate than the devices heretofore employed.

Another object of this invention is to provide such a device which when in use may be with ease arranged and operated to apply a balance of forces to two pipe sections to force them together without lateral misaligning forces which might result in a defective or misaligned joint.

Another object of this invention is to provide such a device which is applicable to joints between pipe sections having a minimum of free length for receiving the anchor parts of such apparatus.

Another object of this invention is to provide such a device which will require a minimum of space surrounding the pipe sections to be joined, permitting its use in limited spaces such as in a narrow ditch or between studs or other structural members of a building construction.

Another object of this invention is to provide such a device which when not in use will occupy a minimum of space to facilitate its storage and transportation.

Other objects and advantages of this invention will become apparent from the following description taken in connection with the accompanying drawings, wherein is illustrated the construction and operation of one embodiment of the invention, it being understood, however, that such illustration is by way of example and not by way of limitation.

In the drawings:

FIG. 1 is a side elevation of an apparatus constructed in accordance with this invention applied to the bell and spigot end portions of two sections of pipe having a joint of the character to which this invention relates formed between them, the apparatus occupying a position typical of the completion of the formation of the joint and a portion of the joint being broken away and shown in longitudinal cross section;

FIG. 2 is a fragmentary cross section taken along the line 2—2 of FIG. 1 and illustrating the engagement of one of the tension member portions of the apparatus to one of the anchors thereof;

FIG. 3 is a transverse cross section through the pipe and apparatus illustrated in FIG. 1 taken along the line 3—3 of FIG. 1 and illustrating in elevation one of the anchors and the mechanical advantage means portions of the jack means employed as parts of this invention;

FIG. 4 is a fragmentary section taken along the line 4—4 of FIG. 3 and illustrating partly in plan and partly in horizontal section one of such mechanical advantage means; and FIG. 5 is a sectional view of the mechanical advantage means illustrated in FIG. 4 taken along the line 5—5 of FIG. 4 and showing the interior mechanism of the mechanical advantage means.

Referring now in more detail to the drawings, the apparatus is illustrated in FIG. 1 as comprising a pair of anchors 10 and 12, respectively, and shown anchored about the bell end 14 of a pipe section 16 and the adjacent body of a pipe section 18 having a spigot end 20 fitted within the bell end 14 with an elastomer gasket 22 therebetween to form a joint of the character to which this invention is applicable.

The remainder of the apparatus is made up of two jack means each having a tension member designated as 24 and 26, respectively, and mechanical advantage means 28 and 30, respectively. The tension members 24 and 26 are adapted to be detachably anchored remote from their free ends, each at a desired position along the length of the anchor 10 and the mechanical advantage means 28 and 30 are likewise adapted to be anchored to the other of said anchors 12 each at a desired point of the length of such anchor. The mechanical advantage means 28 and 30, respectively, engage the tension members 24 and 26 in a manner presently to be more fully described so that when the mechanical advantage means are actuated they will exert a force through the tension members 24 and 26 drawing the anchors 10 and 12 toward one another and moving the pipe sections 16 and 18 into engagement with one another to provide the joint as illustrated in FIG. 1.

The points at which the tension members 24 and 26 are anchored to the anchor 10 and the points at which the mechanical advantage means 28 and 30 are anchored to the anchor 12 are selected to place the jacks made up by such tension members and mechanical advantage means in balanced positions with respect to the pipe sections on which the apparatus is to operate. In the illustration in the drawings two such jack means are illustrated located at diametrically opposite positions with respect to the transverse cross section of the pipe so that the forces exerted by the tension members 24 and 26 will be balanced relative to the pipe and if applied equally will not tend to place any lateral deflecting forces on the pipe joint or produce any tendency toward misalignment during the make-up of the joint. It will be realized that circumstances may in some cases dictate that some number of jack means other than two be employed and the same is within the contemplation of this invention provided they are arranged so as to be in balanced spaced positions about the circumference of the respective pipe sections to be joined.

The anchors 10 and 12 are shown in the drawing as being of identical construction although they are not necessarily so. Each consists primarily of a flexible element illustrated as being a chain made up of links consisting of flat plates 32 arranged in pairs in face-to-face relation with each other, and other links 34 likewise arranged in pairs but spaced from each other with their opposite ends on opposite sides of adjacent ends of pairs of links 32. The adjacent ends of pairs of links 32 and 34 are joined to each other by pins 36 extending therethrough and having their ends projecting laterally of the chain on each side a substantial distance beyond the outer faces of the plates 34. This provides a series of spaced lugs or studs projecting laterally from the chain so made up and the chain itself makes up a flexible member adapted to extend about and embrace a pipe section. The flexible member actually provides the anchor and is adapted to be tightened into anchored position relative to a pipe section by a suitable means for tensioning it about the pipe section.

One such tensioning means is illustrated in FIGS. 1 and 3 in the form of what might be termed a pair of tongs with means for operating them and locking them in closed position. Referring more particularly to FIG. 3, the tongs are illustrated as having a main arm 38 and an auxiliary arm 40, the former being substantially straight in the illustration shown and the latter being illustrated in the form of a bell crank lever with one of its legs pivoted at 42 to an intermediate portion of the leg 38. Free end portions 44 and 46 of these two legs or levers are arranged to move toward and away from each other as the tongs are operated and are provided with means for securing them to selected links of the chains 10 or 12 as the case may be. In the illustration, the end 46 of the leg 40 is permanently secured to one end of the chain 12 by a pivot pin 48 and the lower end 44 of the leg 38 is provided with a bifurcated portion or fork, each leg of which has a notch 50, these aligned notches 50 being adapted to receive a selected one of the pins 36 by engagement with the projecting ends of such pin. In the event it is desired for such engagement to be with a pin 36 located intermediate the ends of the chain, the leg 40 is provided with an offset portion 52 through which the unused free end portion of the chain may project.

The operation of the arms 38 and 40 so as to close the ends 44 and 46 toward one another and tension a chain connected to such ends about a pipe, is by means of pulling together the end 54 of the arm 38 which is opposite the end 44, and the free end 56 of an auxiliary lever pivoted at its end 57 to an intermediate portion of the bell crank arm 40. Intermediate its ends the lever 56 is connected by a pivot 60 to a link 62, the opposite end of which is pivoted at 64 to a slide carried on the lower end of the adjustment screw 66. The lever 40 is urged to its open position relative to the lever 38 by means of a spring 68 secured at one end to an intermediate portion of the lever 40 and at its opposite end to the lever 38 in a position not shown but upwardly from the pivot 42 in FIG. 3.

With the lever 56 in its released position away from the upper end 54 of the arm 38, the lower ends 44 and 46 will be in their more separated position relative to each other. When in this position the chain 12 (or the chain 10 as the case may be) will be placed around the pipe in the desired position and pulled snug about the pipe, at which the notches 50 in the lower end of the lever 38 will be engaged with the projecting ends of the pin 36 with which it can be most easily engaged and leave the chain in its snuggest position around the pipe. Thereupon the lever 56 will be moved toward the lever 54 and the adjusting screw 66 will be adjusted to such a point that it will just permit movement of the lever 56 sufficient for the pivot point 60 to move toward the lever 38 until it passes a straight line between the pivots 57 and 64. At this point it will be seen that the chain will be tight and that the linkage just described will be in locked position with the tension on the chain tending to pull the lever 56 closer to the lever 54.

It will be understood that the anchors of the type just described have been found highly satisfactory but that other types of chains or flexible members may be employed with other types of quick acting means for tightening them around a pipe.

The two anchors illustrated are identical in construction and the description thereof will not be duplicated.

The tension members 25 and 26 are illustrated in the form of roller chains comprising alternate wide and narrow links 69 and 70 joined by pins 72 with each pin preferably being provided with a sleeve bearing 74 in a well known fashion. One end of each flexible member which is opposite its free end is shown provided with a hook-shaped bracket 76 having one end secured to one end of the chain by the terminal pin 78 and its opposite end in the form of a flange or hook 80 having holes 82 therein positioned to engage over the projecting ends of one or more of the pins 36 of the anchor 10. Thus each of the flexible members 24 and 26 may have one of its portions opposite its free end 84 adapted for engagement with a desired one of a number of points along the length of the anchor 10.

The mechanical advantage means 28 and 30 are identical in construction except for being mere images of one another and only one will be described, that being the means 28 illustrated more in detail in FIGS. 4 and 5.

The means 28 has a body 86, one face of which has a channel 88 therethrough through which the anchor 12 is adapted to pass and pipe gripping shoe 90 is secured by suitable means such as screws 92 to the face of the body 86 so as to close a portion of each of the channels 88, leaving the anchor 12 free to slide therethrough but without excessive clearance. The plate 90 is provided with teeth 94 for engaging and gripping a pipe wall, these teeth preferably being of the buttress type tending most strongly to grip the pipe against movement in the direction toward which force is to be applied to the pipe in making up the joint. It will be seen that upon tightening of the anchor 12 the plate or shoe 90 will be drawn tightly against the pipe and the teeth 94 forced to grip the pipe, at the same time anchoring the entire mechanical advantage means to the pipe.

The cover face of the body 86 opposite the plate 90 is closed by a cover plate 96 to keep the working parts of the mechanical advantage means in place within the body 86.

On reference to FIG. 5 it will be seen that the body 86 has a channel 98 therethrough of a size to receive the flexible tension member 24 and permit it to move freely in the direction of its own length through the body 86. For reasons which will appear, the major portion of the wear of this chain within the body 86 will take place on the left side of the channel 98 as it is viewed in FIG. 5 and such wear may be minimized by means of a hardened plate or track 100 secured therein by suitable means such as screws 102.

On the opposite side of the channel 98 is an actuating lever 104 disposed in a cut-away portion 106 of the body 86 and pivoted to the body at 108 to provide a fulcrum. The projecting end of the lever 104 extends a very substantial distance outside of the body 86 as shown in FIGS. 1 and 3 and the end of this lever on the opposite side of the fulcrum 108 is relatively very short so as to give great mechanical advantage in the movement of the pawl 112 secured by a pin 114 to this short end of the lever 104. The pawl is pressed by a spring 116 at all times toward engagement with the chain constituting the tension member 24, but when the lever is in its one extreme position as shown there is a pin 118 which retracts it from engagement with such chain and if the chain is not otherwise held, will permit the chain to move freely in either direction through the body 86. It will be seen that operation of the lever 104 in a reciprocatory motion will cause the pawl 112 to engage the chain and move it in one direction but that upon reciprocation in the opposite direction of the lever 104 the pawl 112 may move freely with respect to the chain, permitting it to remain in the position to which it may have been advanced.

For the purpose of holding the chain in such position to which it may have been advanced a static pawl 120 is mounted on a fixed pivot 122 in the body 86 and is normally spring pressed or biased toward the chain 24 by means of a spring 124 interposed between the pawl 120 and a release lever 126 pivoted to the body at 128 and having an end portion 130 projecting from the body. A spring pressed detent in the form of a ball 132 yieldably retains the release lever 130 either in the position shown in FIG. 5 or in a retracted position on the opposite side of the ball 132. When moved to such retracted position the action of the spring 124 will tend to lift the pawl 120 away from the chain 24 rather than to bias it toward the chain, so that upon release of tension upon the chain this pawl will be retracted and thereafter will permit free movement of the chain in either direction.

In operation the two anchors are placed about the sections of pipe to be joined together, preferably with the anchor 10 about the bell portion of one of the sections of pipe as shown and with the anchor 12 about the body of the adjacent section of pipe in fairly close proximity to the end thereof adapted to fit into the bell but far enough from such end to permit the necessary movement in make-up of the joint. In clamping the anchor 12 about the pipe 18 care will be taken to position the mechanical advantage means 28 and 30 approximately on diametrically opposite sides of the pipe so that their pull will be balanced relative to the center line of the pipe. When in this position it will be seen that the two levers 104 will extend in opposite directions relative to the length of the anchor 12 but will be substantially parallel to each other and extend in the same direction from the pipe 18 so that they may be operated simultaneously by one person.

With the lever 126 in released position and the lever 104 in the position illustrated in FIG. 5, the tension members 24 and 26 will be pulled through the mechanical advantage means 28 and 30 sufficiently to enable them to be readily engaged with points on the anchor 10 corresponding to the positions of the mechanical advantage means 28 and 30 on the anchor 12. The levers 126 will then be moved to active position as shown in FIG. 5 whereupon the free end of each of the chains 24 and 26 may be pulled until portions thereof between the anchors 10 and 12 are tight and they will be held in such positions by the pawls 120. Simultaneous operation of the two levers 104 will apply force to the two pipes balanced on opposite sides of the center thereof to draw them together without applying any lateral force thereon. In view of the great mechanical advantage provided by the action of the levers 104 and pawls 112 the forces required to be applied to the ends of the levers 104 are very small, so small as to be inconsequential as lateral forces on the pipe joint. However, continued reciprocation of the levers 104 will give ample movement to the two pipe sections 16 and 18 relative to one another to completely make up the joint.

It will be noted that extremely short sections of pipe may be joined by this device, indeed on the bell end no length of pipe body is required as the anchor 10 engages the bell as illustrated, and on the straight or spigot end no more length of pipe is required than that necessary to enter the bell plus enough to allow for the anchor 12 and the mechanical advantage means 28 and 30. The apparatus can also be operated in very tight quarters, requiring only a width of trench or other space occupied by the pipe which exceeds the pipe diameter only sufficiently to accept the two mechanical advantage means and the two hooks 76.

Clearly the device illustrated is not limited to use on bell and spigot joints but may be employed on any joints in which a smaller pipe end and a larger one are forced into telescoping engagement with a resilient sealing gasket between them. Thus two identical pipe ends might be forced into the opposite ends of a collar of larger diameter with a gasket between each of the pipe ends and the collar. Also there is no limitation as to the material of which the pipe is to be formed as the device will work for cement or other non-metallic pipe as well as for cast iron or other metal pipe.

Obviously the anchors may be clamped around pipes of a large range of sizes limited only by the length of the anchor chains and the jacks may be placed in balanced positions relative to the circumference of the pipe for any size within such limits. Thus, the device may be used without change or adapters on a wide range of pipe sizes.

When removed from a pipe the apparatus described can obviously be packed in a very small space occupying much less than the diameter of the pipe on which it operates.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. An apparatus for forcing a pair of co-axial pipe sections with adjacent telescoping ends toward each other with a deformable gasket between said ends to provide a sealed joint between said pipe sections, comprising, in combination, a pair of flexible anchors adapted to embrace the pipe sections respectively and be tightened thereabout to be anchored thereto, a plurality of jack means, each having an elongated tension member with an anchorable part remote from one end thereof and detachably anchored to one of said anchors at a desired one of a plurality of points of the length of said one anchor, and mechanical advantage means engaging said tension member between said end and said anchorable part and operable to move said tension member longitudinally of itself to draw said anchorable part nearer to said mechanical advantage means, said mechanical advantage means each having an anchorable part adapted to be anchored to the other of said anchors at a desired one of a plurality of points of its length corresponding respectively to the points at which the anchorable parts of said tension members are anchorable to said one of said anchors, whereby said plurality of jack means may be engaged with said anchors to interconnect them and operable to force them toward each other at a plurality of balanced spaced positions about the circumference of a pair of pipe sections to which said anchors may be anchored.

2. An apparatus in accordance with claim 1 in which said one of said anchors is adapted to be engaged about a larger diameter end of one joint of pipe and said other of said anchors is adapted to be engaged about a smaller diameter portion near the end of the other joint of pipe.

3. An apparatus in accordance with claim 1 in which each of said mechanical advantage means has a reciprocable one-way tension member engaging part engageable with its tension member to move it in one direction and releasable therefrom to move freely in the other direction relative to the tension member, and a static one-way tension member engaging part engageable with said tension member to prevent retrograde movement thereof while said reciprocable part is disengaged from said tension member and disengageable from said tension member to permit it to be moved in said one direction by said reciprocable part, and means for disengaging both of said tension member engaging parts from said tension member simultaneously to permit free retrograde movement of said tension members relative to said mechanical advantage means.

4. An apparatus in accordance with claim 1 in which there are two of said jack means and said mechanical advantage means each has a manually actuated lever extending generally parallel to said other of said anchors when said mechanical advantage means is engaged therewith and said levers on said respective mechanical advantage means extend in opposite directions relative to said other of said anchors when said jack means are positioned diametrically opposite one another relative to a pipe section to which said other of said anchors is anchored and approximately parallel to each other in one direction from the opposite sides of such pipe section.

5. An apparatus in accordance with claim 1 in which said jack means each includes also a part carried by said mechanical advantage means having gripping teeth exposed externally of the respective mechanical advantage means and extended transverse to the direction of the tension member engaged by said mechanical advantage means to engage a pipe, and the anchor engaged by said mechanical advantage means embraces a portion of the mechanical advantage means facing in the opposite direction from said teeth whereby said anchor will clamp the said teeth against a pipe when tightened thereabout.

References Cited by the Examiner
UNITED STATES PATENTS

| | | | |
|---|---|---|---|
| 486,155 | 11/1892 | Brand | 254—74 X |
| 1,894,835 | 1/1933 | Smith et al. | |
| 2,344,320 | 3/1944 | Nidiver | 254—74 |
| 2,920,383 | 1/1960 | Aydelott | 29—237 |

WILLIAM FELDMAN, *Primary Examiner.*

J. C. PETERS, *Assistant Examiner.*